US012380787B2

(12) United States Patent
Patel

(10) Patent No.: US 12,380,787 B2
(45) Date of Patent: Aug. 5, 2025

(54) FIRE DETECTION OR EARLY WARNING USING GASES

(71) Applicant: Carrier Corporation, Palm Beach Gardens, FL (US)

(72) Inventor: Vipul Patel, Sarasota, FL (US)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 0 days.

(21) Appl. No.: 17/949,742

(22) Filed: Sep. 21, 2022

(65) Prior Publication Data

US 2023/0098609 A1 Mar. 30, 2023

Related U.S. Application Data

(60) Provisional application No. 63/249,815, filed on Sep. 29, 2021.

(51) Int. Cl.
*G08B 17/117* (2006.01)

(52) U.S. Cl.
CPC .................................. *G08B 17/117* (2013.01)

(58) Field of Classification Search
CPC ........ G08B 17/117; G08B 17/12; G08B 17/00
See application file for complete search history.

(56) References Cited

U.S. PATENT DOCUMENTS 4,236,822 A * 12/1980 Jaretsky ............... G08B 17/113
356/256
4,911,892 A * 3/1990 Grace .................... G01N 27/12
73/23.31
5,379,026 A * 1/1995 Whittle .................. G08B 21/14
340/632
5,486,811 A * 1/1996 Wehrle ................. G08B 29/183
340/517
5,528,225 A * 6/1996 Sakai ..................... G01N 27/16
340/634
5,563,578 A * 10/1996 Isenstein ................ G08B 21/14
340/634
5,886,638 A * 3/1999 Tanguay ............. G08B 29/145
73/31.06

(Continued)

FOREIGN PATENT DOCUMENTS

GB 252900 A 6/1926
GB 2529000 A * 2/2016 ........... G08B 17/117
WO WO-2009024774 A1 * 2/2009 ............. G08B 17/00

OTHER PUBLICATIONS

Extended European Search Report for European Application No. 22195323.5; Report Mail Date Feb. 10, 2023 (pp. 1-7).

(Continued)

*Primary Examiner* — Hoi C Lau
(74) *Attorney, Agent, or Firm* — CANTOR COLBURN LLP

(57) ABSTRACT

A detection device for monitoring an area includes a housing and at least one sensor configured to measure an amount of at least one combustion gas. A controller is operably coupled to the at least one sensor. The controller is configured to determine if a combustion event is present within the area in response to the amount of the at least one combustion gas measured by the at least one sensor and initiate an alarm in response to determining that the combustion event is present within the area.

12 Claims, 6 Drawing Sheets

(56) References Cited

U.S. PATENT DOCUMENTS

| | | | | | |
|---|---|---|---|---|---|
| 6,046,441 | A * | 4/2000 | Daffron | F24C 7/08 | 219/494 |
| 6,788,197 | B1 * | 9/2004 | Thuillard | G08B 17/107 | 340/630 |
| 10,002,510 | B2 * | 6/2018 | Ryder | G08B 29/188 | |
| 10,295,457 | B1 * | 5/2019 | Ocheltree | G01N 21/274 | |
| 10,388,136 | B2 * | 8/2019 | Ryder | G08B 29/183 | |
| 10,748,400 | B2 * | 8/2020 | Ryder | G08B 17/00 | |
| 11,132,891 | B2 * | 9/2021 | Dearden | G08B 29/145 | |
| 11,151,854 | B2 * | 10/2021 | Ryder | G08B 29/183 | |
| 11,615,685 | B2 * | 3/2023 | Ryder | G01J 1/4204 | 340/577 |
| 11,749,097 | B2 * | 9/2023 | Dearden | G08B 17/10 | 340/630 |
| 2003/0011770 | A1 * | 1/2003 | Cole | G08B 17/113 | 356/338 |
| 2006/0105280 | A1 * | 5/2006 | McAward | F23J 13/00 | 431/154 |
| 2006/0290496 | A1 * | 12/2006 | Peeters | G01D 21/00 | 340/572.1 |
| 2007/0063828 | A1 * | 3/2007 | Drews | G01N 33/004 | 455/226.2 |
| 2008/0230701 | A1 * | 9/2008 | Serero | G01N 21/3504 | 250/339.15 |
| 2011/0169648 | A1 * | 7/2011 | Dutta | G02B 6/1225 | 340/603 |
| 2012/0013472 | A1 * | 1/2012 | Taylor | G01N 33/222 | 340/632 |
| 2014/0375454 | A1 * | 12/2014 | Konrad | G08B 13/2491 | 340/552 |
| 2017/0169683 | A1 * | 6/2017 | Ryder | G01J 5/0846 | |
| 2018/0073982 | A1 * | 3/2018 | Ebata | G01N 21/53 | |
| 2018/0149590 | A1 * | 5/2018 | Erdtmann | G01N 21/53 | |
| 2018/0276966 | A1 * | 9/2018 | Ryder | G01J 1/4204 | |
| 2019/0187038 | A1 * | 6/2019 | Deliwala | G08B 17/113 | |
| 2019/0318599 | A1 * | 10/2019 | Ryder | G08B 29/188 | |
| 2019/0344109 | A1 * | 11/2019 | Enk | A62C 37/04 | |
| 2020/0135001 | A1 * | 4/2020 | Liang | G08B 25/10 | |
| 2020/0166470 | A1 * | 5/2020 | Chen | G01N 27/123 | |
| 2020/0249158 | A1 * | 8/2020 | Deliwala | G01N 21/53 | |
| 2020/0270925 | A1 * | 8/2020 | Hotomi | G01N 33/0036 | |
| 2020/0302767 | A1 * | 9/2020 | Sugizaki | G08B 17/107 | |
| 2020/0340937 | A1 * | 10/2020 | Park | G01N 27/124 | |
| 2020/0342731 | A1 * | 10/2020 | Ryder | G08B 17/00 | |
| 2020/0363312 | A1 * | 11/2020 | Deliwala | G01N 15/1434 | |
| 2020/0383172 | A1 * | 12/2020 | McCracken | H04W 88/06 | |
| 2020/0386677 | A1 * | 12/2020 | Deliwala | G08B 17/107 | |
| 2020/0394886 | A1 * | 12/2020 | Antar | G01N 15/0211 | |
| 2021/0065536 | A1 * | 3/2021 | Dearden | G08B 17/10 | |
| 2021/0095514 | A1 * | 4/2021 | Madden | E04H 6/42 | |
| 2021/0104140 | A1 * | 4/2021 | Park | G08B 17/117 | |
| 2021/0183232 | A1 * | 6/2021 | Dearden | G08B 29/145 | |
| 2021/0396696 | A1 * | 12/2021 | Hornung | G01N 25/18 | |
| 2022/0001797 | A1 * | 1/2022 | Yang | G08B 21/182 | |
| 2022/0005335 | A1 * | 1/2022 | Ryder | G08B 29/188 | |
| 2022/0260512 | A1 * | 8/2022 | Osswald | G08B 21/16 | |
| 2022/0276163 | A1 * | 9/2022 | Cheung | G01N 21/53 | |
| 2022/0319294 | A1 * | 10/2022 | Hang | G08B 21/14 | |
| 2023/0098609 | A1 * | 3/2023 | Patel | G08B 17/117 | 340/632 |
| 2023/0349807 | A1 * | 11/2023 | Deliwala | G08B 17/113 | |

OTHER PUBLICATIONS

Office Action for European Application No. 22195323.5; Report Mail Date Mar. 13, 2024 (pp. 1-4).

* cited by examiner

FIRE DETECTION OR EARLY WARNING USING GASES

CROSS-REFERENCE TO RELATED APPLICATIONS

This application claims the benefit of U.S. Provisional Application No. 63/249,815 filed Sep. 29, 2022, the disclosure of which is incorporated herein by reference in its entirety.

BACKGROUND

Exemplary embodiments of the present disclosure relate to a detection system operable to detect one or more conditions within a predetermined area or space, and more particularly, to a detection device suitable for use in a detection system.

Existing life safety devices, such as commercial and/or industrial smoke detectors commonly use infrared light scattering or ionization-based techniques to detect the presence of a hazardous condition in the area being monitored. Each of these systems requires the smoke or other aerosols generated by the fire to reach the detector, or a chamber internal to the detector or area to detect a smoldering fire. However, an environment including a smoldering fire typically lacks the thermal energy needed to move the smoke aerosols toward the detector. In addition, other components surrounding the smoke detector, such as a sounder or battery for example, may inhibit entry of the smoke aerosol into the detection chamber. As a result, the fire may burn for a significant amount of time before the presence of the fire is detected by such a detector.

BRIEF DESCRIPTION

According to an embodiment, a detection device for monitoring an area includes a housing and at least one sensor configured to measure an amount of at least one combustion gas. A controller is operably coupled to the at least one sensor. The controller is configured to determine if a combustion event is present within the area in response to the amount of the at least one combustion gas measured by the at least one sensor and initiate an alarm in response to determining that the combustion event is present within the area.

In addition to one or more of the features described above, or as an alternative to any of the foregoing embodiments the at least one sensor is operable to measure a plurality of combustion gases.

In addition to one or more of the features described above, or as an alternative to any of the foregoing embodiments the at least one sensor is a single sensor.

In addition to one or more of the features described above, or as an alternative to any of the foregoing embodiments the at least one sensor includes a plurality of sensors, each of the plurality of sensors being operable to measure a respective one of the plurality of combustion gases.

In addition to one or more of the features described above, or as an alternative to any of the foregoing embodiments the at least one combustion gas includes nitrogen dioxide (NO2).

In addition to one or more of the features described above, or as an alternative to any of the foregoing embodiments the at least one combustion gas includes hydrogen (H2).

In addition to one or more of the features described above, or as an alternative to any of the foregoing embodiments the housing includes an internal chamber, the at least one sensor being operable to measure the amount of the at least one combustion gas within the internal chamber.

In addition to one or more of the features described above, or as an alternative to any of the foregoing embodiments the at least one sensor arranged adjacent an exterior of the housing to measure the amount of the at least one combustion gas of an environment surrounding the housing.

In addition to one or more of the features described above, or as an alternative to any of the foregoing embodiments comprising a fluid movement mechanism configured to direct a flow within the area towards the detection device.

In addition to one or more of the features described above, or as an alternative to any of the foregoing embodiments the detection device is at least one of a photoelectric detector, an ionization detector and a detector including a thermal sensor.

According to an embodiment, a method for operating a detection device includes measuring, via at least one sensor, an amount of at least one combustion gas within an area being monitored and determining if a combustion event is present within the area being monitored in response to the amount of the at least one combustion gas.

In addition to one or more of the features described above, or as an alternative to any of the foregoing embodiments measuring the amount of the at least one combustion gas within the area being monitored further comprises measuring the amount of a plurality of combustion gases within the area being monitored.

In addition to one or more of the features described above, or as an alternative to any of the foregoing embodiments determining if the combustion event is present within the area being monitored further comprises comparing the amount of the at least one combustion gas with a threshold.

In addition to one or more of the features described above, or as an alternative to any of the foregoing embodiments the at least one combustion gas includes a plurality of combustion gases and the combustion event is determined to be present when the amount of at least one of the plurality of combustion gases exceeds a respective threshold.

In addition to one or more of the features described above, or as an alternative to any of the foregoing embodiments the at least one combustion gas includes a plurality of combustion gases and the combustion event is determined to be present when the amount of each of the plurality of combustion gases exceeds a respective threshold.

In addition to one or more of the features described above, or as an alternative to any of the foregoing embodiments determining if the combustion event is present within the area being monitored further comprises comparing a change or a rate of change in the amount of the at least one combustion gas with a threshold.

In addition to one or more of the features described above, or as an alternative to any of the foregoing embodiments the at least one combustion gas includes a plurality of combustion gases and the combustion event is determined to be present when the change or the rate of change of at least one of the plurality of combustion gases exceeds a respective threshold.

In addition to one or more of the features described above, or as an alternative to any of the foregoing embodiments the at least one combustion gas includes a plurality of combustion gases and the combustion event is determined to be present when the change or the rate of change of each of the plurality of combustion gases exceeds a respective threshold.

In addition to one or more of the features described above, or as an alternative to any of the foregoing embodiments the at least one combustion gas includes nitrogen dioxide (NO2).

In addition to one or more of the features described above, or as an alternative to any of the foregoing embodiments the at least one combustion gas includes hydrogen (H2).

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
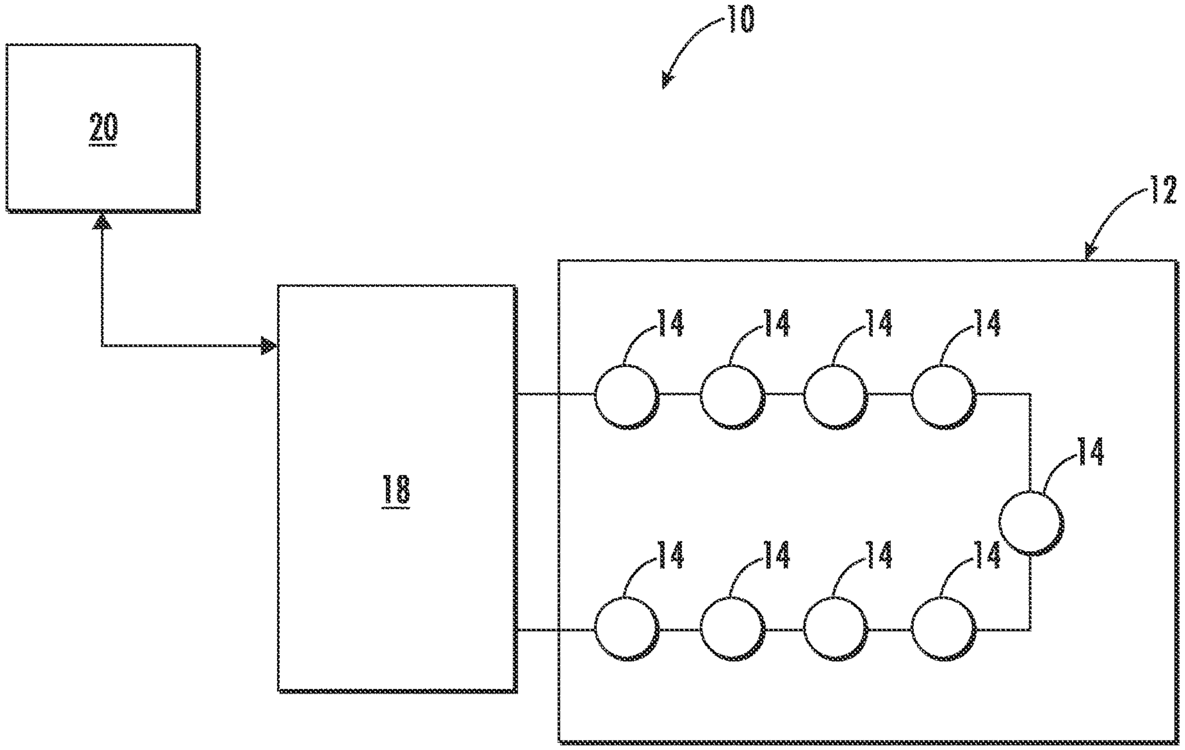
FIG. 1 is a schematic diagram of an example of a fire detection system.

With reference now to FIG. 1, a schematic view an embodiment of a fire detection system 10 is illustrated. The fire detection system 10 may be part of a fire loop 12, such as located within a building or a portion of a building for example. As shown, the system 10 includes a plurality of life safety devices 14 arranged in an array in the building 12. All or a portion of the life safety devices 14 are configured to detect fire, smoke and/or other properties in the area surrounding the device within the array. Examples of suitable life safety devices include but are not limited to, detectors, sounders, beacons, remote indicators, and input/output modules for example. In the illustrated, non-limiting embodiment, the plurality of life safety devices 14 are connected to a central control panel 18, such as a fire alarm control panel (FACP). However, in other embodiments, the plurality of life safety devices 14 may be connected to one another, such as via a remote device like a cloud server, or alternatively, directly such as in instances where the life safety devices are smart devices. In some embodiments, the fire detection system 10 is connected with, for example, a network 20 to communicate a status of the fire detection system 10 and/or sound an alarm in the case of a fire. Although system 10 is described with reference to detection of a fire, it should be understood that the system 10 and the life safety devices 14 herein may be adapted for detection of a variety of hazardous conditions, including but not limited to smoke, carbon monoxide, toxic chemicals or gasses, explosive gas, and heat for example.

Figure 2:
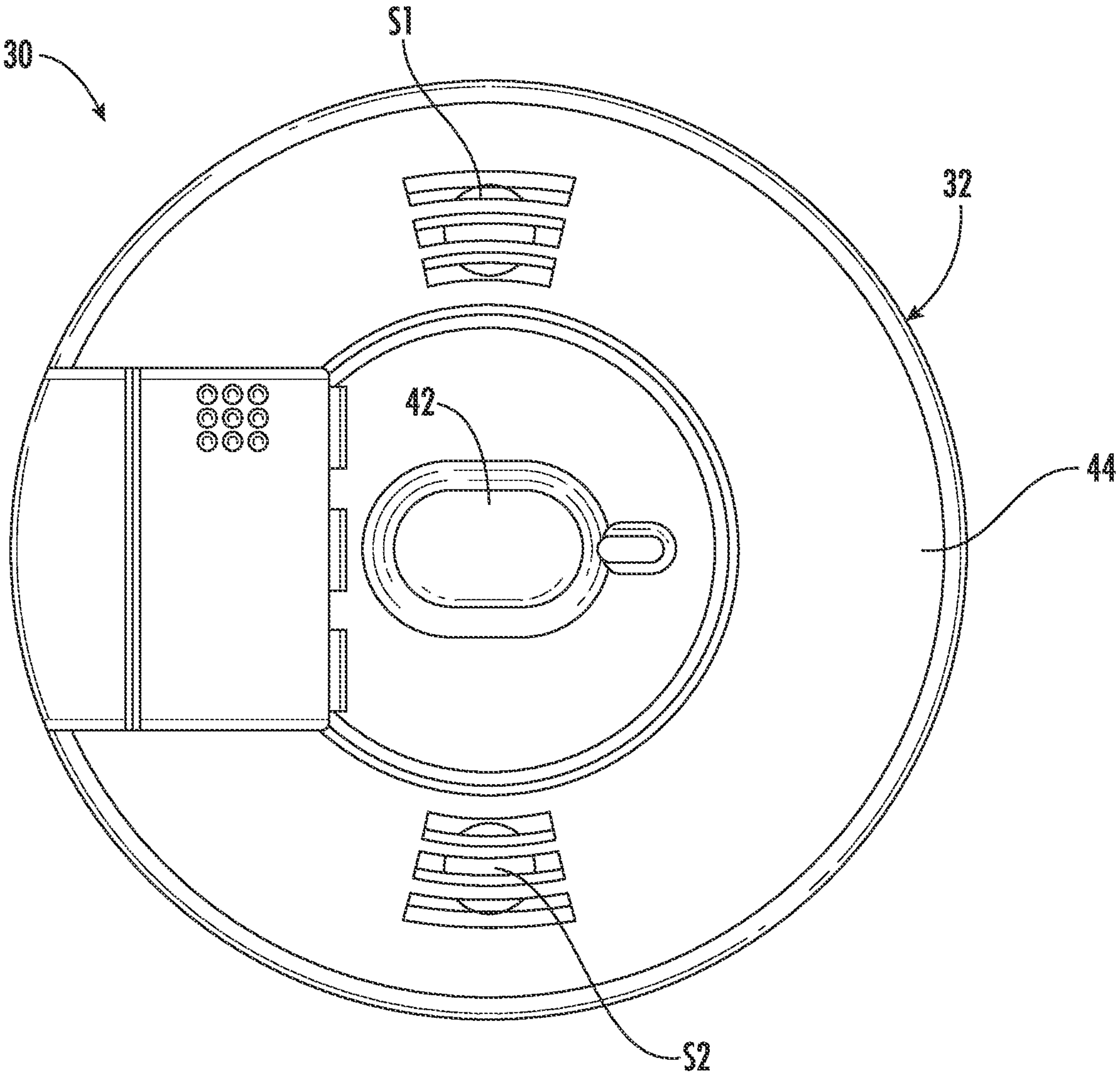
FIG. 2 is a plan view of an exemplary detection device according to an embodiment.
Figure 3:
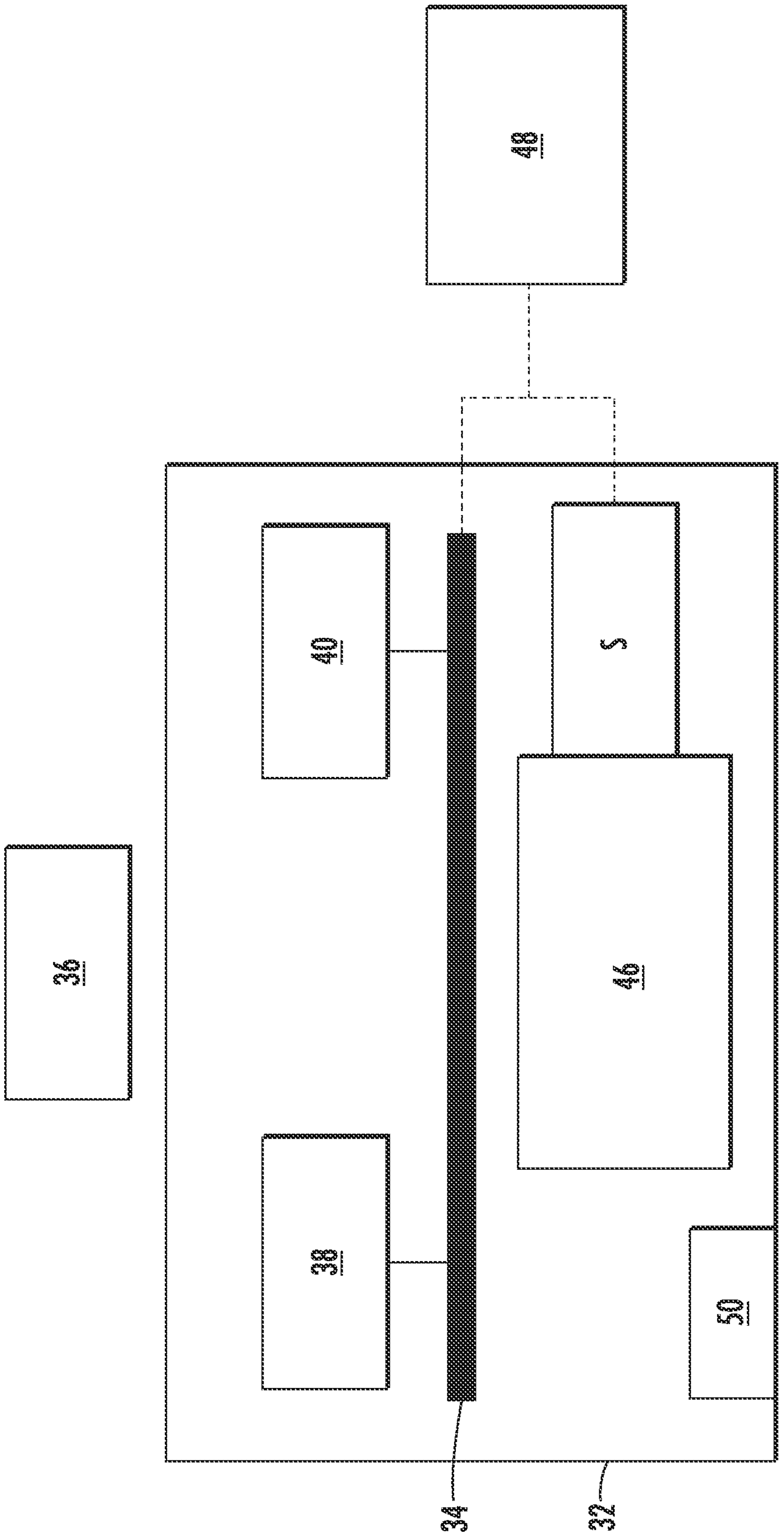
FIG. 3 is a schematic diagram of an exemplary detection device according to an embodiment.

With reference now to FIGS. 2 and 3, an example of a detection device 30, suitable for use as a life safety device 14 in the fire detection system 10 of FIG. 1 is illustrated. The detection device 30 includes a housing 32 mountable to a portion of a building or other structure. Although not shown, the housing 32 may be formed from a first upper housing portion and a second lower housing portion that is removably connected to the first portion. As used herein, the terms "upper", "lower", and the like are in reference to the device in use as it is mounted on a surface, such as a ceiling in a building for example. Therefore, the upper housing portion is typically closer to the mounting surface than the lower housing portion, and the lower housing portion is typically the portion of the device that faces toward the area being monitored. However, in other embodiments, the housing 32 may be formed as a single piece or body.

Arranged within the interior of the housing 32 are one or more components or controls necessary for operation of the device. In an embodiment, these controls include a printed circuit board 34 having circuitry and/or components associated with at least one detection circuit (not shown) and at least one alarm circuit (not shown). In some embodiments, the detection device 30 may be hardwired to a power source, illustrated schematically at 36, located within the building or area where the detection device 30 is mounted, remote from the detection device 30. In such embodiments, the printed circuit board 34 may be directly or indirectly connected to the power source 36. In an embodiment, the detection device 30 may include a compartment for receiving one or more batteries 38 sufficient to provide the power necessary to operate the detection device 30 for an extended period of time. In an embodiment, the power provided by the batteries 38 may be the sole source of power used to operate the detection device 30. However, in other embodiments, the battery power may be supplemental to the remote power source 36, for example in the event of a failure or loss of power at the power source 36.

A sound generation mechanism 40 may be connected to the printed circuit board 34 within the housing 32. The sound generation mechanism 40 is operable to receive power from the printed circuit board 34 to generate a noise in response to detection of a condition. Alternatively, or in addition, one or more actuatable mechanisms 42 (see FIG. 2), such as a button for example, may be operably coupled to the printed circuit board 34 and exposed at a surface 44 of the housing 32. The actuatable mechanism 42 may be configured to perform one or more functions of the detection device 30 when actuated. Examples of operations that may be performed by the actuatable mechanism 42 include, but are not limited to, a press to test function, an "hush" function, and/or enrollment in a system, such as system 10 including a plurality of life safety devices 14 configured to communicate with one another wirelessly. Although the actuatable mechanism 42 is shown positioned generally at the center of the housing 32, embodiments where the actuatable mechanism 42 is located at another position are also within the scope of the disclosure.

In an embodiment, the detection device 30 has an internal chamber 46 arranged within the interior of the housing 32. In such embodiments, the internal chamber 46 is fluidly coupled to the area surrounding the device such that ambient materials, such as air, smoke, and non-smoke particles for example, are configured to flow into the internal chamber 46 through a filter or other similar feature. In other embodiments, however, the detection device 30 is a chamber-less device (see FIG. 2).

During a combustion event, such as a fire, toxic combustion gases, such as carbon monoxide (CO), oxides of nitrogen (NOx), hydrogen (H2), hydrogen cyanide (HCN), and hydrogen chloride (HCL) for example, are typically formed before smoke aerosols or particles. The type and amount of gases that are formed during the combustion process varies based on the type of combustion process (flaming vs. smoldering) and the material(s) involved. Unlike existing photoelectric and ionization detection devices which are configured to determine the occurrence of a combustion event in response to detecting the presence of smoke aerosols, the detection device 30 described herein is configured to use the amount of one or more combustion gases to detect the occurrence of a combustion event.

Figure 4:
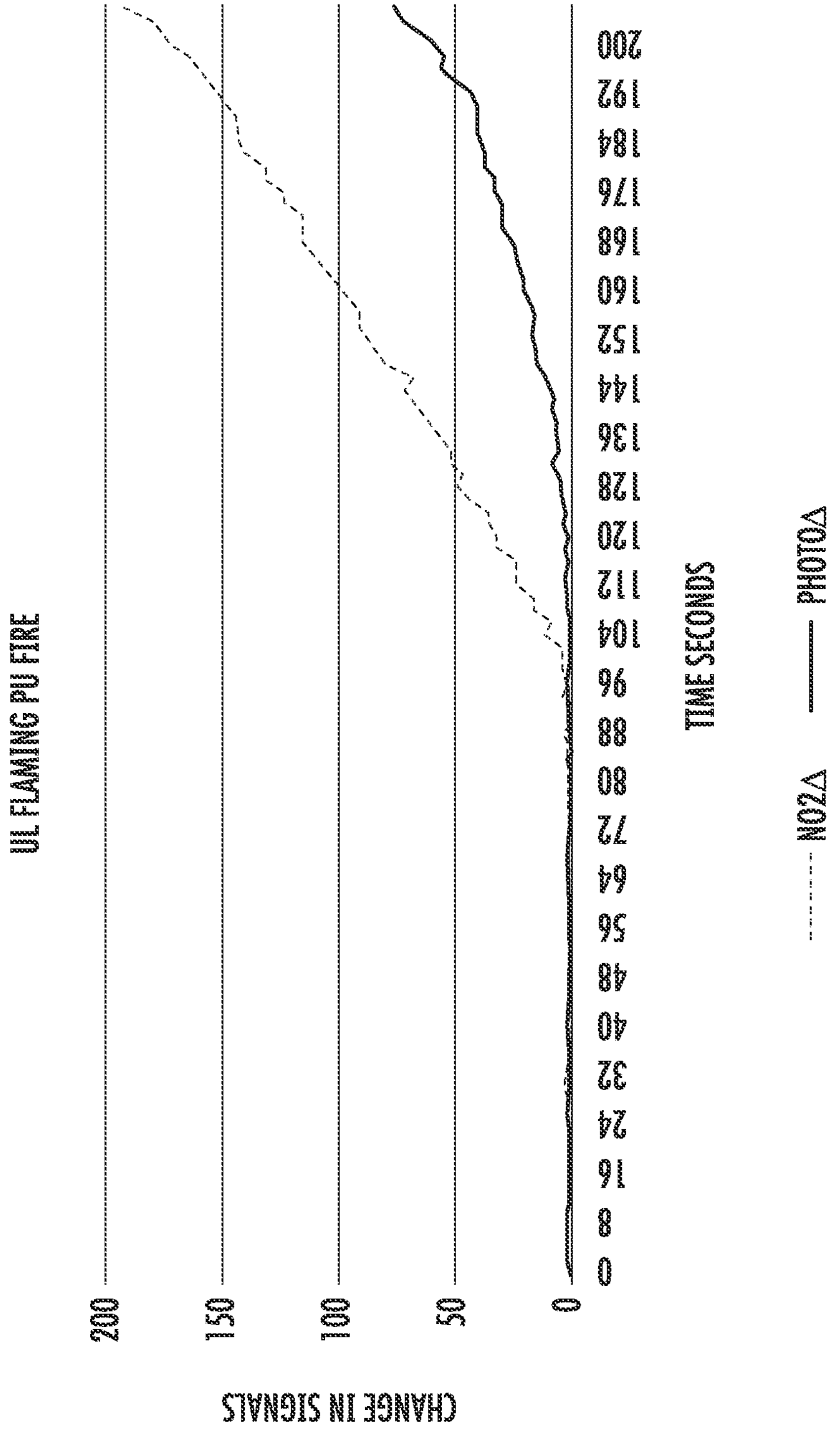
FIG. 4 is a graph comparing a rate of change of a level of nitrogen dioxide with the detection signal of an existing photoelectric smoke detectors with respect to a flaming fire.
Figure 5:
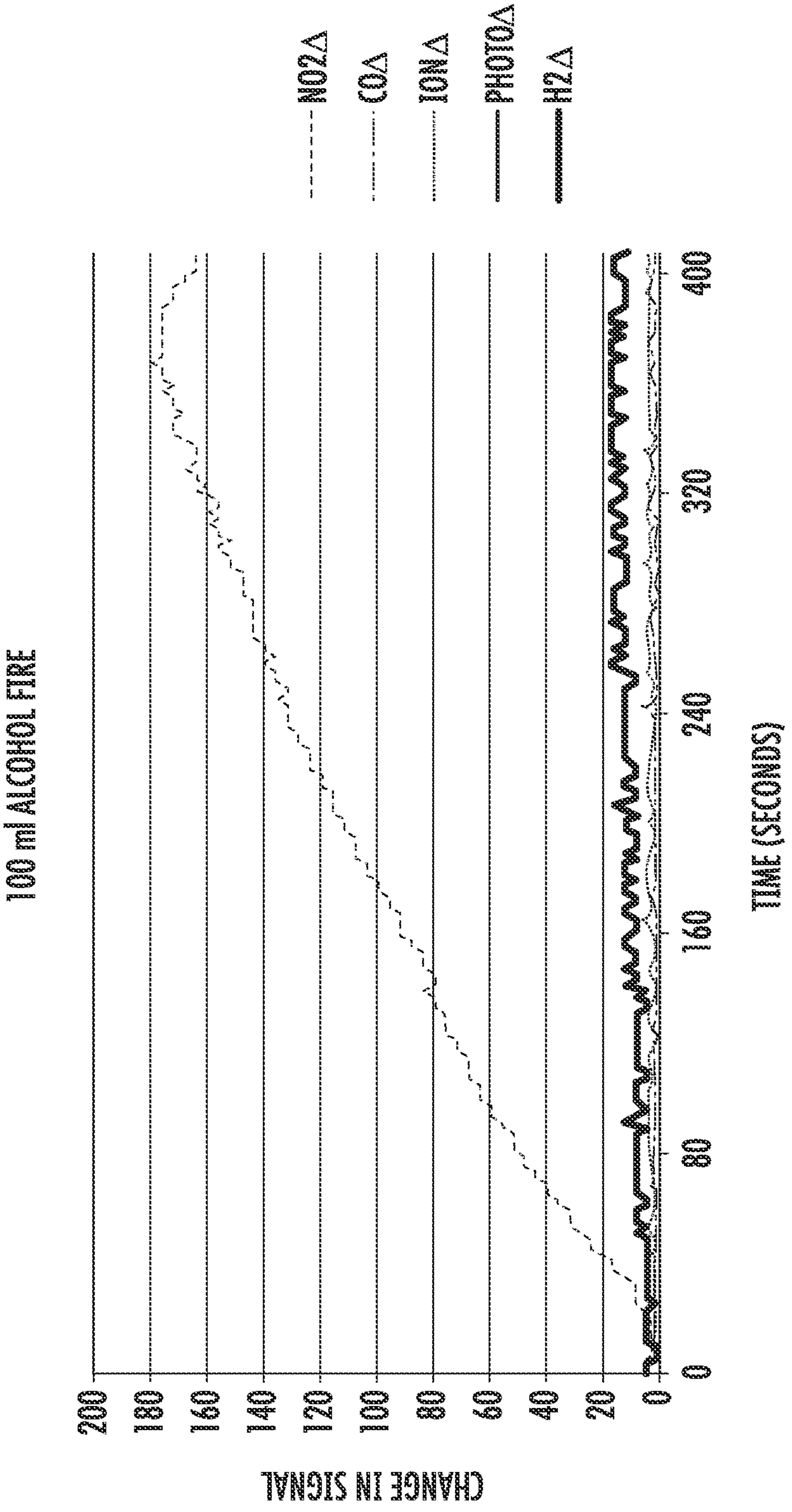
FIG. 5 is a graph comparing a rate of change of a level of various combustion gases with the detection signals of existing photoelectric and ionization smoke detectors with respect to an alcohol fire.
Figure 6:
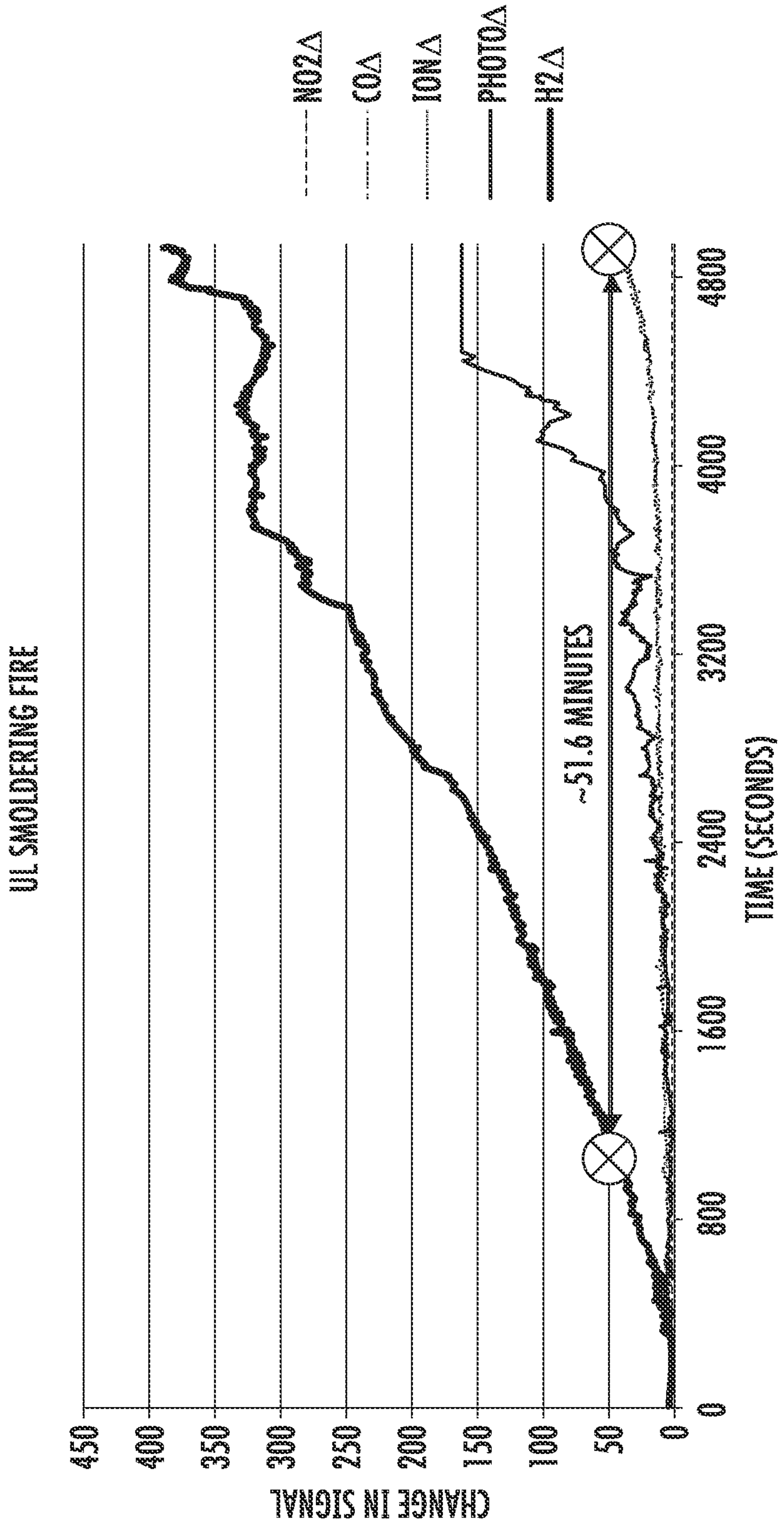
FIG. 6 is a graph comparing a rate of change of a level of various combustion gases with the detection signals of existing photoelectric and ionization smoke detectors with respect to a smoldering fire.

With continued reference to FIGS. 1-3, and further reference to FIGS. 4-6, examples of the combustion gases present during various combustion events are provided. Because nitrogen (N2) is present in air, nitrogen dioxide is formed during combustion at high temperatures. As a result, flaming fires (see FIG. 4) where little or no smoke is present, such as may occur when burning alcohol for example (see FIG. 5), can be detected using nitrogen dioxide (NO2). Similarly, hydrogen and/or carbon monoxide gases are typically generated during a smoldering fire (FIG. 6).

In an embodiment, the detection device 30 is configured to measure the amount of one or more combustion gases via at least one sensor S. The at least one sensor S is operably coupled to a controller 48, and in some embodiments is operably coupled to the printed circuit board 34. The controller 48 may be localized controller arranged at or within the detection device 30, or alternatively, may be located at another location within the fire detection system 10, such as at the central control panel 18 for example. In embodiments where the detection device 30 is configured to measure a single combustion gas, the combustion gas may be nitrogen dioxide or hydrogen. Further, in an embodiment, the detection device 30 is configured to measure amounts of a plurality of combustion gases, for example carbon monoxide, nitrogen dioxide, and hydrogen. However, it should be understood that a detection device 30 operable to measure any combustion gas or combination of combustion gases is within the scope of the disclosure. The detection device 30 may include a single sensor S operable to measure the one or more combustion gases, or alternatively, may include a plurality of sensors S1, S2 . . . , each of which is operable to measure a respective combustion gas. In embodiments where the detection device 30 has an internal chamber 46, as shown in FIG. 3, the one or more sensors S are operably coupled to the internal chamber 46. Similarly, in embodiments where the detection device 30 is chamber-less, the one or more sensors may be positioned adjacent to and in fluid communication with an exterior of the housing 32 such that the one or more sensors S1, S2 (see FIG. 2) are operably coupled to the area adjacent to or surrounding the detection device 30.

A fluid movement mechanism 50, such as a fan for example, may be associated with the detection device 30. In an embodiment, the fan 50 is configured to draw or blow air, combustion gas, and other particles within the ambient environment being monitored towards the detection device 30. In embodiments including a fluid movement mechanism 50, the mechanism may be located remotely from the detection device 30, or alternatively, may be integrated into the detection device 30.

During operation of the detection device, the data collected by the at least one sensor S is evaluated to determine if a combustion event is present in the area surrounding the detection device 30. To determine if a combustion event, such as a fire, is occurring, the controller 48 operably coupled to the at least one sensor S is configured to compare data provided by the sensor(s) with a respective limit or threshold associated with a combustion event. For example, in an embodiment, the one or more sensors S provide continuous or intermittent signals to the controller 48 indicating a level or an amount of a respective combustion gas. In an embodiment, the measured amount of the combustion gas must exceed a predetermined threshold, such as for a continuous period of time for example, to indicate that a combustion event or fire is present. However, in other embodiments, any instance where the measured amount of the combustion gas exceeds a respective threshold associated with the combustion gas may be sufficient to detect a fire.

Alternatively, or in addition, the controller 48 may be configured to calculate, using the previously described measured amounts of combustion gases, a change or rate of change of each of the combustion gases being monitored. In such embodiments, the controller 48 similarly compares the change or rate of change of each combustion gas with a respective predetermined threshold or limit associated with a combustion event. The determination may be made using only a single calculation of the change or rate of change in the measured amount of one or more combustion gases, or alternatively, the change or rate of change may need to exceed a threshold for at least a minimum period of time to indicate the presence of a combustion event.

Further, in embodiments where the detection device 30 has one or more sensors S operable to measure a plurality of combustion gases, the controller 48 may be configured to determine that a combustion event is occurring if the measured amount of a single combustion gas, and/or the calculated change or rate of change of the measured amount of a single combustion gas exceeds a threshold. However, in other embodiments, the measured amount or calculated change/rate of change of the measured amount of two or more of the plurality of combustion gases being monitored must exceed a respective threshold to indicate that a combustion event is present. In an embodiment, the measured amount or calculated change/rate of change of the measured amount of each of the combustion gases being monitored by the sensor(s) S of the detection device 30 must exceed a corresponding threshold to indicate that a combustion event is occurring within the area being monitored by the detection device 30. In response to positively determining that a combustion event is present, the controller 48 may initiate an alarm, such as via the sound generation mechanism 40 and/or another indicator of the detection device 30 and/or may communicate with the central control panel 18 or a fire alarm control panel network 20 to operate one or more other life safety devices 14 of the fire detection system 10, such as a separate sounder of visual indicator for example, to indicate the presence of a fire.

Although the detection device 30 is illustrated and described herein as a separate detection from the other life safety devices 14 within the fire detection system 10, it should be understood that in other embodiments, the sensing of one or more combustion gases and the detection of a combustion event using the data of the sensed combustion gas may be integrated into another life safety device 14, including but not limited to a photoelectric detector and an ionization detector, or another detector including a thermal or heat sensor.

Because gas molecules are lighter and travel more quickly than smoke aerosol, it is possible to detect a flaming fire and a smoldering fire (see FIG. 6) substantially earlier using a detection device 30 monitoring combustion gas compared to a detection device monitoring smoke particles. In addition, depending on the measured amount or rate of change of each of the combustion gases being monitored, the detection device 30 is able to distinguish between a flaming fire and a smoldering fire. Further, a detection device 30 that relies on the combustion gases in the area being monitored to detect a fire is less susceptible to false alarms, such as due to steam for example.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A detection device for monitoring an area comprising:

a chamber-less housing;

a plurality of sensors arranged at an exterior of the housing, the plurality of sensors being operable to measure an amount of a respective combustion gas of a plurality of combustion gases; and a controller operably coupled to the plurality of sensors, wherein the controller is configured to:

receive a signal from each of the plurality of sensors indicative of an amount of a corresponding combustion gas present within the area;

determine, in response to the amount of at least two of the plurality of combustion gases measured by the plurality of sensors, if a combustion event is present within the area and whether the combustion event is a smoldering fire or a flaming fire; and initiate an alarm in response to determining that the combustion event is present within the area.

2. The detection device of claim 1, wherein the plurality of combustion gases include nitrogen dioxide (NO2).

3. The detection device of claim 1, wherein the plurality of combustion gases includes hydrogen (H2).

4. The detection device of claim 1, further comprising a fluid movement mechanism configured to direct a flow within the area towards the detection device.

5. The detection device of claim 1, wherein the detection device is at least one of a photoelectric detector, an ionization detector and a detector including a thermal sensor.

6. A method for operating a detection device, comprising:

measuring an amount of a plurality of combustion gases within an area being monitored, the plurality of combustion gases being measured via a plurality of sensors arranged at an exterior of the detection device; and determining if a combustion event is present within the area being monitored in response to the amount of at least two of the plurality of combustion gases; and determining if the combustion event is a smoldering fire or a flaming fire.

7. The method of claim 6, wherein determining if the combustion event is present within the area being monitored further comprises comparing the amount of the at least one of the plurality of combustion gases with a threshold.

8. The method of claim 7, wherein the combustion event is determined to be present when the amount of each of the plurality of combustion gases exceeds a respective threshold.

9. The method of claim 6, wherein the combustion event is determined to be present when the change or the rate of change of the at least one of the plurality of combustion gases exceeds a respective threshold.

10. The method of claim 6, wherein the combustion event is determined to be present when the change or the rate of change of each of the plurality of combustion gases exceeds a respective threshold.

11. The method of claim 6, wherein the plurality of combustion gases include nitrogen dioxide (NO2).

12. The method of claim 6, wherein the at least plurality of combustion gases include hydrogen (H2).

* * * * *